Patented Feb. 6, 1945

2,368,653

UNITED STATES PATENT OFFICE 2,368,653

ALKYLATION

Alfred W. Francis, Woodbury, N. J., assignor to Socony-Vacuum Oil Company, Incorporated, New York, N. Y., a corporation of New York No Drawing. Application February 28, 1942, Serial No. 432,789

24 Claims. (Cl. 260—683.4)

This invention relates to catalytic alkylation and is particularly concerned with alkylation of paraffinic hydrocarbons with olefins in the presence of an aluminum chloride catalyst.

As is well known in tht art, paraffins, particularly tertiary paraffins, such as isobutane, have been alkylated with olefins of four or more carbon atoms to produce alkylates of high value for motor fuels. Lower olefins react with paraffins only with great difficulty and at the present time the only important commercial process of low temperature alkylation of paraffins comprises reaction of butenes with isobutane in the presence of sulphuric acid as a catalyst. At extremely high temperatures and elevated pressures, ethylene may be used to alkylate paraffins, but no satisfactory low temperature process, catalytic or otherwise, is known to the art for this most difficult of the alkylation processes.

I have now found that alkylation of paraffins with ethylene and other olefins may be readily accomplished at low temperatures to give products valuable as anti-knock fuels for internal combustion engines, blending with low octane gasolines and other purposes. This result is accomplished by using, as a catalyst, aluminum chloride or the like, dissolved in an inert solvent; the metallic salt being present in molal excess. The use of solvents in connection with an aluminum chloride catalyst has been heretofore proposed for certain easily-induced reactions in the nature of the classical Friedel-Crafts synthesis. These previous catalytic solutions have been dilute, on the order of nitrobenzene solutions containing 20 to 30 per cent aluminum chloride dissolved. The sole purpose in such cases has been to modify vigorous reactions by dilution of the catalyst, and it is found that these solutions are practically inert in alkylation reactions.

As opposed to the above-noted concept of diluting aluminum chloride to reduce its effect, I find that solutions of that catalyst which contain a predominant amount of aluminum chloride possess greatly enhanced power to catalyze aliphatic hydrocarbon alkylation reactions. As will appear hereinafter, the increased effect seems to be associated with, and is probably due to, increased area of contact between hydrocarbons and catalyst with recurring presentation of fresh catalytic surfaces at the area of contact.

The solvents suitable for the purposes of this invention are liquids which will dissolve at least an equimolecular proportion of aluminum chloride and which are substantially inert, i. e., enter into no appreciable reaction with the catalyst or hydrocarbons in the reaction mixture, although some of them appear to have power to activate the catalyst. A good test for determining the suitability of a solvent, is addition of water to a rich solution of aluminum chloride in the solvent in question. If vigorous reaction results, the solvent is generally suited to the present purposes.

A study of the operative solvents leads to the generalization that the solvent molecule usually includes an oxygen atom, although this may not be essential, so long as the desired properties are possessed by the solvent. In view of the fact that the solvent itself is inert, this structural test must be regarded as merely a reasonably safe guide for selection of solvents having adequate solvent power and not as a pre-requisite for operability. In other words, those skilled in the art are advised to select solvents having oxygen atoms in the molecule as having greater solvent powers. It should be remembered, of course, that the solvent must be substantially inert. This limitation excludes those compounds, such as water, or excessive amounts of alcohols, glycols and the like.

Among the solvents found suited to the present purpose are nitrobenzene, the nitrotoluenes, the nitrochlorbenzenes, benzophenone, benzoyl chloride and sulphur dioxide. Certain general classes are suitable. Thus, ethers as typified by diethyl ether and di-isopropyl ether; ketones, such as acetone and methyl ethyl ketone; and the esters, such as ethyl acetate and isopropyl acetate are eminently satisfactory solvents. A number of these compounds form equimolecular complexes with aluminum chloride, melting at elevated temperatures. However, with excess aluminum chloride the solvents form eutectic mixtures melting at much lower temperatures. Among the solvents unsuitable for the purposes of the invention because of their low solvent power for the catalyst are carbon disulphide, hydrocarbons, halogenated hydrocarbons and inorganic chlorides such as hydrogen chloride, phosphorus trichloride, stannic chloride, and titanium tetrachloride.

It is, of course, essential that the temperature at which the process is conducted be sufficiently high to maintain the mixture of catalyst and solvent at least partly in the liquid state. A further precaution may be observed with distinct advantage. There appears to be a definite relationship between the efficiency of the reaction and the thoroughness of the mixing of the catalyst and the hydrocarbon. It is therefore highly advisable to conduct the reaction in a vessel provided with an agitating device which extends well into the lower liquid phase composed primarily of catalyst and solvent.

The first two examples, employing no solvent, are given to show the effect of a solvent by contrast with the other examples.

Example I

An autoclave of 290 ml. capacity was charged with 125 g. of isobutane and 27 g. of aluminum chloride, closed, and ethylene at 150–175 pounds pressure was maintained in the autoclave for one hour at 25–30° C. The autoclave was then cooled to −20° C., opened, and the contents poured out. The liquid was found to be substantially unchanged isobutane, boiling below 0° C. The aluminum chloride was recovered in solid granular form.

Example II

Example I was repeated with an identical result.

Example III

One-hundred twenty-five g. of isobutane, 27 g. of aluminum chloride and 7 g. of liquid sulphur dioxide were subjected to treatment in the autoclave identical with the conditions set out in Example I. From the reaction mixture, the colorless product (165 g.) was separated from the catalyst, a dark red viscous liquid. Upon distillation, the following fractions were found in the separated liquid:

| | Grams |
|---|---|
| Isopentane | 60 |
| Hexanes (chiefly 2, 3, dimethyl butane B. P. 58° C.) | 35 |
| Heptanes | 25 |
| Fraction boiling 95° C. to 150° C | 25 |
| Residue | 20 |

Example IV

The liquid sulphur dioxide of Example III was replaced with an equal quantity by weight of ethyl ether. The product obtained was of substantially the same characteristics as the product of the previous example.

Example V

The procedure of Example I was repeated except that 6 g. of ethyl acetate was introduced to the autoclave before introduction of ethylene. The product was substantially the same as that of Example III with respect to amount and distillation curve.

Example VI

Six g. of acetone were used as was ethyl acetate in Example V, with substantially the same result.

Example VII

The autoclave was charged with 125 g. isobutane, 30 g. aluminum chloride and 14 g. ethyl ether. A cylinder of propylene was connected and that gas charged to the autoclave at about 100 pounds pressure for 1.5 hours. The product contained 50 g. of isopentane and hexanes, 30 g. of heptanes and 50 g. of higher boiling material.

In general, the relative amounts of solvent and aluminum chloride may be varied considerably within the scope of the invention, provided that the aluminum chloride is present in at least approximately equimolecular amounts with respect to the solvent and that the mixture contains sufficient solvent to render it fluid and homogeneous at the reaction temperature, i. e., the mixture must have a melting point below the temperature of the reaction. In most cases, it is preferred that the mixture have a melting point not substantially above about 100° C. While an equimolecular mixture will normally show a substantial effect, it is better that even larger proportions of aluminum chloride be used, preferably at least about 3 mols aluminum chloride to 2 mols of solvent; while with certain solvents, of which ethyl acetate is an example, it is desirable that the mol ratio be in the neighborhood of 3 to 1.

Care should be exercised in the use of certain solvents in particular those containing nitro groups, in view of their tendency to decompose in the presence of aluminum chloride. For example, it has been found that nitrobenzene, although not commonly considered explosive, may become so at temperatures upwards of 90° C. in the presence of a molecular excess of aluminum chloride.

Although only aluminum chloride is discussed above, it will be obvious to those skilled in the art that this salt may be replaced with other metal and metalloid halide catalysts of the Friedel-Crafts type.

I claim:

1. The process of alkylating paraffinic hydrocarbons with olefinic hydrocarbons which comprises reacting said hydrocarbons in the presence of aluminum chloride dissolved in not more than an equimolecular proportion of a substantially inert solvent therefor at a temperature above the melting point of the solution.

2. The process of alkylating paraffinic hydrocarbons with olefinic hydrocarbons which comprises reacting said hydrocarbons in the presence of aluminum chloride dissolved in a substantially inert solvent therefor, the mol ratio of aluminum chloride to solvent being at least 3 to 2, at a temperature above the melting point of the solution.

3. The process of alklating paraffinic hydrocarbons with olefinic hydrocarbons which comprises reacting said hydrocarbons in the presence of aluminum chloride dissolved in not more than an equimolecular proportion of a substantially inert solvent therefor at a temperature above the melting point of the solution, said solution having a melting point not substantially in excess of 100° C.

4. The process of alkylating paraffinic hydrocarbons with olefinic hydrocarbons which comprises reacting said hydrocarbons in the presence of aluminum chloride dissolved in a substantially inert solvent therefor, the mol ratio of aluminum chloride to solvent being at least 3 to 2, at a temperature above the melting point of the solution, said solution having a melting point not substantially in excess of 100° C.

5. The process of alkylating paraffinic hydrocarbons with olefinic hydrocarbons which comprises reacting said hydrocarbons in the presence of aluminum chloride dissolved in not more than an equimolecular proportion of liquid sulphur dioxide at a temperature above the melting point of the solution.

6. The process of alkylating paraffinic hydrocarbons with olefinic hydrocarbons which comprises reacting said hydrocarbons in the presence of aluminum chloride dissolved in not more than an equimolecular proportion of ethyl ether at a temperature above the melting point of the solution.

7. The process of alkylating paraffinic hydrocarbons with olefinic hydrocarbons which comprises reacting said hydrocarbons in the presence of aluminum chloride dissolved in not more than an equimolecular proportion of nitrobenzene at a temperature above the melting point of the solution.

8. The process of alkylating tertiary paraffinic hydrocarbons with olefinic hydrocarbons which comprises reacting said hydrocarbons in the presence of aluminum chloride dissolved in not more than an equimolecular proportion of a substantially inert solvent therefor at a temperature above the melting point of the solution.

9. The process of alklating tertiary paraffinic hydrocarbons with olefinic hydrocarbons which comprises reacting said hydrocarbons in the presence of aluminum chloride dissolved in a substantially inert solvent therefor, the mol ratio of aluminum chloride to solvent being at least 3 to 2, at a temperature above the melting point of the solution.

10. The process of alkylating tertiary paraffinic hydrocarbons with olefinic hydrocarbons which comprises reacting said hydrocarbons in the presence of aluminum chloride dissolved in not more than an equimolecular proportion of a substantially inert solvent therefor at a temperature above the melting point of the solution, said solution having a melting point not substantially in excess of 100° C.

11. The process of alkylating tertiary paraffinic hydrocarbons with olefinic hydrocarbons which comprises reacting said hydrocarbons in the presence of aluminum chloride dissolved in a substantially inert solvent therefor, the mol ratio of aluminum chloride to solvent being at least 3 to 2, at a temperature above the melting point of the solution said solution, having a melting point not substantially in excess of 100° C.

12. The process of alkylating tertiary paraffinic hydrocarbons with olefinic hydrocarbons which comprises reacting said hydrocarbons in the presence of aluminum chloride dissolved in not more than an equimolecular proportion of liquid sulphur dioxide at a temperature above the melting point of the solution.

13. The process of alkylating tertiary paraffinic hydrocarbons with olefinic hydrocarbons which comprises reacting said hydrocarbons in the presence of aluminum chloride dissolved in not more than an equimolecular proportion of ethyl ether at a temperature above the melting point of the solution.

14. The process of alkylating tertiary paraffinic hydrocarbons with ethylene which comprises reacting said hydrocarbons with ethylene in the presence of aluminum chloride dissolved in not more than an equimolecular proportion of a substantially inert solvent therefor at a temperature above the melting point of the solution.

15. The process of alkylating tertiary paraffinic hydrocarbons with ethylene which comprises reacting said hydrocarbons with ethylene in the presence of aluminum chloride dissolved in a substantially inert solvent therefor, the mol ratio of aluminum chloride to solvent being at least 3 to 2, at a temperature above the melting point of the solution.

16. The process of alkylating tertiary paraffinic hydrocarbons with ethylene which comprises reacting said hydrocarbons with ethylene in the presence of aluminum chloride dissolved in not more than an equimolecular proportion of a substantially inert solvent therefor at a temperature above the melting point of the solution, said solution having a melting point not substantially in excess of 100° C.

17. The process of alkylating tertiary paraffinic hydrocarbons with ethylene which comprises reacting said hydrocarbons with ethylene in the presence of aluminum chloride dissolved in a substantially inert solvent therefor, the mol ratio of aluminum chloride to solvent being at least 3 to 2, at a temperature above the melting point of the solution, said solution having a melting point not substantially in excess of 100° C.

18. The process of alkylating tertiary paraffinic hydrocarbons with ethylene which comprises reacting said hydrocarbons with ethylene in the presence of aluminum chloride dissolved in not more than an equimolecular proportion of liquid sulphur dioxide at a temperature above the melting point of the solution.

19. The process of alkylating tertiary paraffinic hydrocarbons with ethylene which comprises reacting said hydrocarbons with ethylene in the presence of aluminum chloride dissolved in not more than an equimolecular proporation of ethyl ether at a temperature above the melting point of the solution.

20. The process of alkylating tertiary paraffinic hydrocarbons with ethylene which comprises reacting said hydrocarbons with ethylene in the presence of aluminum chloride dissolved in not more than an equimolecular proportion of nitrobenzene at a temperature above the melting point of the solution.

21. The process of alkylating tertiary paraffinic hydrocarbons with olefinic hydrocarbons which comprises reacting said hydrocarbons in the presence of aluminum chloride dissolved in not more than an equimolecular proportion of nitrobenzene at a temperature above the melting point of the solution.

22. The process of alkylating paraffinic hydrocarbons with olefinic hydrocarbons which comprises reacting said hydrocarbons in the presence of aluminum chloride dissolved in liquid sulfur dioxide, the mole ratio of aluminum chloride to sulfur dioxide being at least 3 to 2, at a temperature above the melting point of the solution.

23. The process of alkylating paraffinic hydrocarbons with olefinic hydrocarbons which comprises reacting said hydrocarbons in the presence of aluminum chloride dissolved in liquid ethyl ether, the mole ratio of aluminum chloride to ethyl ether being at least 3 to 2, at a temperature above the melting point of the solution.

24. The process of alkylating paraffinic hydrocarbons with olefinic hydrocarbons which comprises reacting said hydrocarbons in the presence of aluminum chloride dissolved in nitrobenzene, the mole ratio of aluminum chloride to nitrobenzene being at least 3 to 2, at a temperature above the melting point of the solution.

ALFRED W. FRANCIS.